United States Patent
Migone et al.

(10) Patent No.: US 8,026,311 B2
(45) Date of Patent: Sep. 27, 2011

(54) PROCESS FOR PRODUCTION OF PROPYLENE COPOLYMERS

(75) Inventors: Rubén A. Migone, Pittsburgh, PA (US); Sehyun Kim, Murrysville, PA (US)

(73) Assignee: Braskem America, Inc., Philadelphia, PA (US)

( * ) Notice: Subject to any disclaimer, the term of this patent is extended or adjusted under 35 U.S.C. 154(b) by 859 days.

(21) Appl. No.: 11/090,523

(22) Filed: Mar. 25, 2005

(65) Prior Publication Data

US 2006/0217502 A1 Sep. 28, 2006

(51) Int. Cl.
C08L 23/00 (2006.01)
C08L 23/04 (2006.01)
C08L 23/10 (2006.01)

(52) U.S. Cl. .............................. 525/191; 525/240

(58) Field of Classification Search .................. 525/191, 525/240
See application file for complete search history.

(56) References Cited

U.S. PATENT DOCUMENTS

| 5,006,600 | A | | 4/1991 | Buechner et al. |
| 5,473,021 | A | * | 12/1995 | Koura et al. .................. 525/247 |
| 5,912,202 | A | * | 6/1999 | Oskam et al. .................. 502/104 |
| 5,985,973 | A | * | 11/1999 | Sumitomo et al. ............. 524/451 |
| 6,174,969 | B1 | | 1/2001 | Kersting et al. |
| 6,686,433 | B1 | * | 2/2004 | Miro et al. ..................... 526/351 |
| 6,984,600 | B2 | * | 1/2006 | Chosa et al. .................. 502/116 |
| 7,160,964 | B2 | * | 1/2007 | Bigiavi et al. ................. 526/142 |
| 7,217,772 | B2 | * | 5/2007 | Migone et al. .................. 526/65 |
| 7,238,758 | B2 | * | 7/2007 | Yoshikiyo et al. ............ 526/128 |
| 2001/0012874 | A1 | | 8/2001 | Huffer et al. |
| 2005/0027080 | A1 | * | 2/2005 | Bodiford et al. ........... 525/331.7 |

FOREIGN PATENT DOCUMENTS

WO WO 99/20663 4/1999
WO WO 2005/058984 A1 6/2005

* cited by examiner

*Primary Examiner* — Nathan M Nutter
(74) *Attorney, Agent, or Firm* — Duane Morris LLP

(57) ABSTRACT

The properties and the amounts of polymers produced in the second stage of a polymerization process in the presence of propylene and ethylene or other alpha olefin are controlled by the addition of an external electron donor to the second stage polymerization. The dosage of external donor to the second stage polymerization is based on a percentage of the dosage of external donor to a first stage polymerization of propylene in the process. The external donor added to the second stage is either the same as or different from the external donor added to the first stage.

5 Claims, 1 Drawing Sheet

PROCESS FOR PRODUCTION OF PROPYLENE COPOLYMERS

FIELD OF THE INVENTION

The present invention relates to the field of processes for the production of polypropylene. More specifically, the present invention relates to processes for producing copolymers of propylene.

BACKGROUND OF THE INVENTION

Polypropylene in general is produced in a process using multiple gas and/or liquid phase reactors. For a polypropylene impact copolymer, a propylene homopolymer is normally produced in a first stage polymerization, followed by ethylene-propylene or other alpha olefin-propylene copolymer in a second stage polymerization. The overall properties of the impact copolymer are a function of the homopolymer produced in the first stage and the copolymer produced in the second stage. Further, the qualities of the homopolymer and copolymer are a function of the polymerization conditions in the first and second stage respectively. As a result, manufacturers are constantly looking for new ways to manipulate polymerization conditions to produce improved impact copolymers. In addition, producing more polymers for a given amounts of catalyst and co-catalyst employed for the polymerization would be beneficial.

It would be desirable to provide a new method for manipulating the properties as well as the amounts of polymers produced in the second stage polymerization.

SUMMARY OF THE INVENTION

The present invention is a process for producing propylene copolymers. The process comprises polymerizing propylene in the presence of a Ziegler-Natta catalyst in a first stage comprising at least one gas phase or liquid phase reactor, wherein a first amount of an external donor is added to the first stage. The polymerization product from the first stage is passed to a second stage comprising at least one gas phase or liquid phase reactor, wherein propylene, and ethylene or other alpha-olefin, are polymerized in the presence of the first stage polymerization product. A second amount of an external donor is added to the second stage. Optionally, an antistatic inhibitor is also added to the second stage.

DETAILED DESCRIPTION OF THE INVENTION

Figure 1:
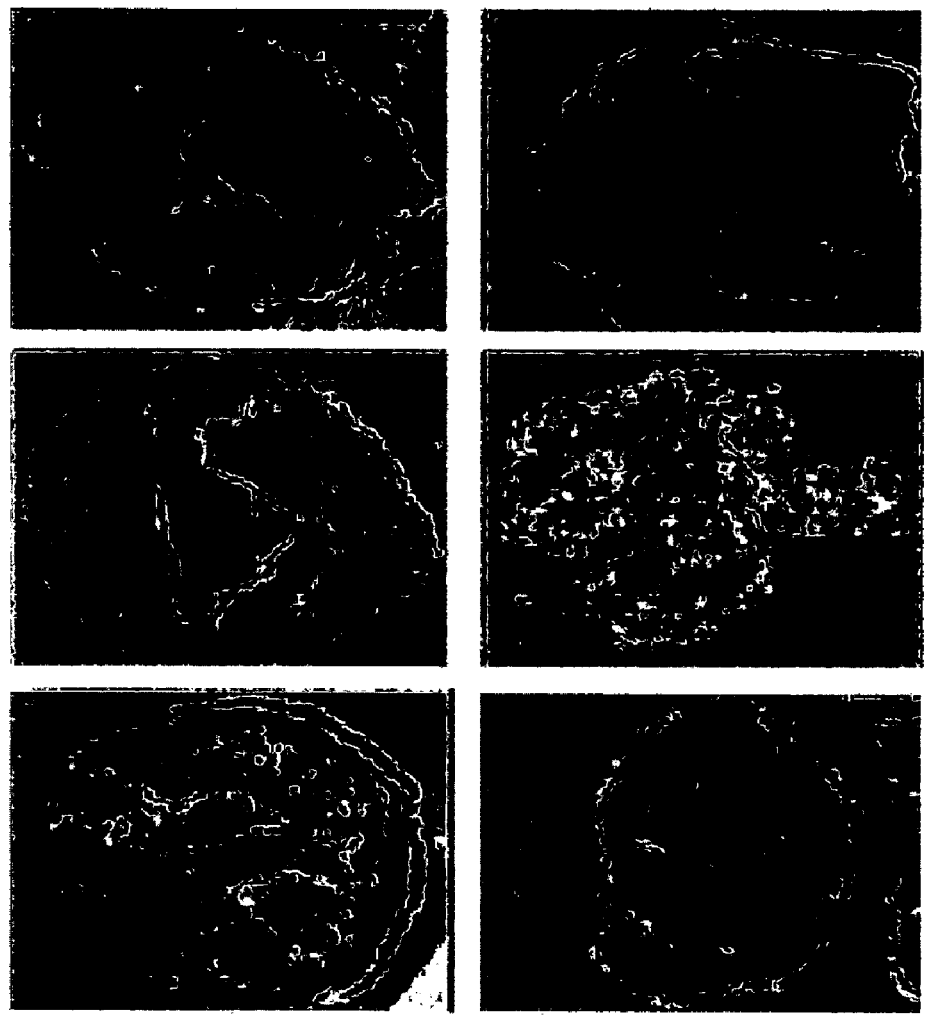
FIG. 1: Illustrates SEM photos of the cross-sectional area of propylene/ethylene copolymer powders.

Polypropylene copolymers in general are produced in multiple reactors. For an impact copolymer, a homopolymer is produced in the first stage polymerization, followed by ethylene-propylene or other alpha olefin-propylene copolymer in the second stage polymerization. Other alpha olefins that may be used in lieu of ethylene in the second stage include $C_4$ and higher alpha olefins, preferably $C_4$, $C_6$ or $C_8$ alpha olefins. In particular, the first stage in which the propylene homopolymer is formed comprises at least one gas phase or liquid phase polymerization reactor. The polymerization product from this first stage is then passed to a second stage comprising at least one gas phase or liquid phase polymerization reactor wherein the copolymer is formed in the presence of the polymerization product from the first stage. The second stage copolymerization is generally accomplished without the addition of additional catalyst. The term liquid phase reactor as used herein is intended to encompass both the slurry process and liquid propylene process as described by Ser van der Ven in "Polypropylene and Other Polyolefins",© 1990, Elsevier Science Publishing Company, Inc., pp. 119-125. Both the slurry process and the liquid propylene process are described as operating with a suspension of growing polymer particles in a liquid. In the case of the slurry process, the liquid is an inert solvent. In the case of the liquid propylene process it is liquid monomer.

In most polymerizations using Ziegler-Natta (ZN) type catalysts, the first stage propylene polymerization includes the addition of a co-catalyst comprising a metal alkyl, such as triethylaluminum, and an external electron donor to enhance and/or modify the activity and iso-specificity of the catalyst and thus modify the properties of the propylene homopolymer produced in the first stage.

According to the current invention additional external donor is added to the second stage copolymerization, preferably in an amount from about 10 percent to about 200 percent of the amount of external donor added to the first stage on a molar basis. The external donor added to the second stage may be the same as or different from the external donor added to the first stage. Exemplary external donors that are useful in the present invention include the non-limiting examples, cyclohexylmethyldimethoxysilane, dicyclopentyldimethoxysilane, diisopropyldimethoxysilane, di-t-butyldimethoxysilane, cyclohexylisopropyldimethoxysilane, n-butylmethyldimethoxysilane, tetraethoxysilane, 3,3,3-trifluoropropylmethyldimethoxysilane and mono and di-alkylaminotrialkoxysilanes. A preferred class of external donors is mono and di-alkylaminotrialkoxysilanes, particularly diethylaminotriethoxysilane. The external donor may be added to the second stage polymerization in any manner as long as one can wet the polymer powders with the external donor. Exemplary methods for injecting the external donor include; through a monomer feed stream to the polymerization, by spraying into the incoming powder, and/or any reactor port.

According to a preferred embodiment of the current invention, the first stage comprises at least one liquid phase loop reactor and the second stage comprises at least one gas phase reactor. Where the second stage copolymerization is a gas phase polymerization, the activity of the catalyst and the composition of the copolymer produced depend on the polymerization conditions and the gas phase ratio, respectively.

It has been found that addition of additional external donor to the copolymerization increases the amounts of bi-polymer formed and modifies the characteristics of copolymer. Bi-polymer comprises the polymers that are produced in the gas phase reactor at a given gas phase ratio. In the case of the mixture of ethylene and propylene, the bi-polymer is a combination of polyethylene or polyethylene-like polymer and ethylene/propylene copolymer. The addition of external donor to the copolymerization of ethylene and propylene increases the amount of bi-polymer formed, increases the molecular weight of ethylene/propylene (EP) copolymer and promotes ethylene incorporation in the copolymer.

Characterization

Several samples of propylene impact copolymers were produced according to the current invention. These materials were tested according to the following methods. The amounts of xylene soluble (XS) and xylene insoluble (XIS) were determined by a method based on ASTM 5492. Molecular weights were determined by high temperature size exclusion chromatography (HSEC) at 140° C. The 75 MHz $^{13}$C-NMR spectra were recorded to determine the ethylene content and sequence distributions in each fraction.

For thermal characteristics, DSC (Differential Scanning Calorimetry) was recorded, where polymer was melted at 230° C. for 5 minutes and cooled to 0° C. at a rate of 10° C./min while recording the recrystallization exotherm. Then, the sample was heated to 190° C. at a rate of 10° C./min to record the melting endotherms.

Donor Injection to Second-stage Gas Phase Reactor During Copolymerization

Several impact copolymers were produced by first polymerizing propylene in a first stage liquid phase polymerization under standard conditions. For the copolymerization of propylene and ethylene in the second stage gas phase polymerization, external donor was injected in amounts about 10 or 20% of the amount added in the first stage. The external donor was injected to the second stage gas phase reactor through the monomer feed stream of ethylene. The donor used in this case was diethylaminotriethoxysilane. To assess the effect of additional antistatic inhibitor, small amounts of Atmer® 163, ethoxylated amine, available from CIBA were also injected with the external donor in one sample. While not wishing to be bound by any theory, the inventors believe that the antistatic agent inhibits catalyst activity and thereby modifies the properties of the copolymers produced in the second stage polymerization. The polymers produced with and without additional external donor and Atmer® 163 are given in Table I.

The results may be summarized as follows.

The addition of external donor increased the ethylene ($C_2$) incorporation in ethylene/propylene (EP) copolymer, which is measured as xylene solubles (XS).

The addition of external donor increased the amounts of bi-polymer, especially in the xylene insoluble (XIS) portion of the polymer. The presence of additional antistatic inhibitor decreased the formation of EP copolymer, i.e. decreased XS.

The molecular weight (Mw) of XS increased with increasing the amounts of additional external donor. Despite increased hydrogen/ethylene ($H_2/C_2$) ratio, the additional external donor increased the molecular weight (Mw) of EP copolymer (247 vs. 338 Mw/1000), resulting in decrease in MFR.

The addition of 20% external donor to gas phase reactor decreased melt flow rate (MFR) without antistatic inhibitor, but increased MFR with antistatic inhibitor.

The thermal characteristics of the polymers are comparable to each other, where the overall crystallinity depends on the amounts of xylene solubles.

Most of the mechanical properties except for the low temperature instrumented impact (IIMP) were comparable. It appears that the instrumented impact depends on the amounts and molecular weight (Mw) of the biopolymer.

Since the donor addition to the gas phase reactor promotes the ethylene incorporation, the donor injection into the gas phase reactor is expected to be beneficial to the production of impact copolymer materials that require relatively high Mw

TABLE I

Impact copolymers produced with and without additional external donor and antistatic inhibitor

| Parameter | Unit | 2400528B | | C | | D | | E | |
|---|---|---|---|---|---|---|---|---|---|
| Donor to Gas phase reactor | | none | | 10% diethylamino triethoxysilane | | 20% diethylamino triethoxysilane | | 20% diethylamino triethoxysilane and Atmer 163 | |
| $H_2/C_2^-$ | [ratio] | 0.033 | | 0.028 | | 0.034 | | 0.035 | |
| Xylene Sols | Wt % | 19 | | 18.9 | | 20 | | 17.3 | |
| | | XIS | XS | XIS | XS | XIS | XS | XIS | XS |
| C2 | % wt | 3.0 | 38.7 | 3.3 | 40.3 | 3.5 | 40.9 | 3.0 | 39.7 |
| MWD | | 5.58 | 4.67 | 5.11 | 4.6 | 5.48 | 4.26 | 4.9 | 4.45 |
| Mn | 1000 | 28.2 | 52.9 | 30.7 | 54.5 | 28.8 | 79.4 | 30.5 | 73.8 |
| Mw | 1000 | 157 | 247 | 157 | 251 | 158 | 338 | 150 | 328 |
| Mz | 1000 | 578 | 895 | 480 | 834 | 643 | 922 | 481 | 951 |
| Mz + 1 | 1000 | 1404 | 1958 | 1353 | 1794 | 1923 | 1783 | 1051 | 1886 |
| MFR | g/10' | 43.4 | | 44 | | 37.6 | | 43.5 | |
| Tc-Major | ° C. | 114 | | 113.5 | | 114.1 | | 114.3 | |
| Tc-minor | ° C. | 93.2 | | 92.6 | | 93.1 | | NA | |
| Tm-PE | ° C. | 116 | | 115.2 | | 116.7 | | NA | |
| Tm-PP | ° C. | 162.6 | | 162.2 | | 162.5 | | 162.9 | |
| % Cryst-DSC | % | 46 | | 47.5 | | 47 | | 52.3 | |
| % Cryst-XRD | % | 50.1 | | 52.6 | | 50.7 | | 54.8 | |
| Flex modulus | kpsi | 169.1 | | 170.1 | | 167.5 | | 174.3 | |
| Izod | ftlb/in | 1.4 ± .12 | | 1.49 ± .06 | | 1.46 ± .1 | | 1.46 ± .13 | |
| TYS[a] | psi | 3455 ± 10 | | 3399 ± 30 | | 3384 ± 8 | | 3521 ± 11 | |
| IIMP[b] [−29 C.] | ftlbs | 12.8 | | 19.8 | | 20.6 | | 15.3 | |
| Rockwell | | 79.6 ± .4 | | 81 ± .3 | | 78.8 ± .6 | | 83.6 ± .4 | |
| DTUL@66 psi | ° C. | 86.6 | | 88.3 | | 87.4 | | 86.7 | |

[a]tensile yield stress;
[b]instrumented impact

EP copolymer. The SEM photos of the cross-sectional area of the copolymer powders are shown in FIG. 1.

The invention has thus been described in general terms, with reference to specific examples. The full scope of the invention will be apparent to those of ordinary skill in the art based on the appended claims.

What is claimed is:

1. A process for promoting ethylene incorporation into an ethylene/propylene copolymer and increasing the molecular weight of said copolymer, the process comprising:
    in a first stage comprising at least one polymerization reactor, polymerizing propylene in the presence of a Ziegler-Natta catalyst, wherein a first amount of an external donor is added to the first stage,
    passing a polymerization product from the first stage to a second stage comprising at least one polymerization reactor, and
    polymerizing propylene and ethylene in said second stage, in the presence of said propylene homopolymer, wherein a second amount of an external donor is added to the second stage,
    wherein the external donor is selected from the group consisting of cyclohexylmethyldimethoxysilane and diethylaminotriethoxysilane, and further comprising adding an antistatic inhibitor to the second stage,
    wherein the external donor added to the first stage is the same as the external donor added to the second stage.

2. The process according to claim 1, wherein the second amount of external donor is from about 10 percent to about 200 percent of the first amount.

3. The process according to claim 1, wherein the second stage comprises at least one gas phase reactor.

4. The process according to claim 3, wherein the first stage comprises at least one liquid phase reactor.

5. A process for promoting ethylene incorporation into an ethylene/propylene copolymer and increasing the molecular weight of said copolymer, the process comprising:
    in a first stage comprising at least one polymerization reactor, polymerizing propylene in the presence of a Ziegler-Natta catalyst, wherein a first amount of an external donor is added to the first stage,
    passing a polymerization product from the first stage to a second stage comprising at least one polymerization reactor, and
    polymerizing propylene and ethylene in said second stage, in the presence of said propylene homopolymer, wherein a second amount of an external donor is added to the second stage,
    wherein the external donor is selected from the group consisting of cyclohexylmethyldimethoxysilane and diethylaminotriethoxysilane, and further comprising adding an antistatic inhibitor to the second stage,
    wherein the external donor added to the first stage is different from the external donor added to the second stage.

* * * * *